United States Patent
Trautenberg et al.

(10) Patent No.: US 7,576,691 B2
(45) Date of Patent: Aug. 18, 2009

(54) APPARATUS AND PROCESS FOR A GLOBAL NAVIGATION SATELLITE SYSTEM MEETING SAFETY OF LIFE PERFORMANCE REQUIREMENTS

(75) Inventors: Hans L. Trautenberg, Ottobrunn (DE); Hugues Favin-Leveque, Buc (FR); Bertrand Boutteau, Paris (FR)

(73) Assignee: EADS Astrium GmbH, Munich (DE)

( * ) Notice: Subject to any disclaimer, the term of this patent is extended or adjusted under 35 U.S.C. 154(b) by 0 days.

(21) Appl. No.: 11/723,704

(22) Filed: Mar. 21, 2007

(65) Prior Publication Data
US 2007/0285310 A1 Dec. 13, 2007

(30) Foreign Application Priority Data
Mar. 22, 2006 (EP) ................... 06005846

(51) Int. Cl.
*G01S 1/00* (2006.01)
(52) U.S. Cl. .................. 342/357.09; 342/357.16
(58) Field of Classification Search ...............
342/357.01–357.17
See application file for complete search history.

(56) References Cited

U.S. PATENT DOCUMENTS

| | | | |
|---|---|---|---|
| 5,650,770 A * | 7/1997 | Schlager et al. .......... | 340/573.1 |
| 6,373,432 B1 * | 4/2002 | Rabinowitz et al. ..... | 342/357.16 |
| 6,639,541 B1 * | 10/2003 | Quintana et al. .............. | 342/18 |
| 2004/0088111 A1 | 5/2004 | Ahlbrecht et al. | |
| 2004/0119638 A1 * | 6/2004 | Fagan et al. ............ | 342/357.03 |
| 2004/0252053 A1 * | 12/2004 | Harvey ................... | 342/357.15 |
| 2005/0018795 A1 * | 1/2005 | Studenny et al. ............ | 375/343 |
| 2005/0060069 A1 * | 3/2005 | Breed et al. .................... | 701/29 |
| 2005/0187677 A1 * | 8/2005 | Walker ........................ | 701/16 |
| 2006/0047413 A1 * | 3/2006 | Lopez et al. ................ | 701/200 |
| 2006/0214844 A1 * | 9/2006 | Fagan et al. ............ | 342/357.02 |

OTHER PUBLICATIONS

Oehler Veit et al., "The Galileo Integrity Concept", XP-002375520, ION GNSS 17th International Technical Meeting of the Satellite Division, Sep. 21-24, 2004, Long Beach, CA, pp. 604-615.
Ober, Pieter Bastiaan et al., "SBAS Integrity Verification", XP-002397832, ION GPS 2001, Sep. 11-14, 2001, Salt Lake City, UT, pp. 1805-1830.
Fernow, James et al., "Estimating Continuity of GNSS", XP-002397833, ION GNSS 17th International Technical Meeting of the Satellite Division, Sep. 21-24, 2004, Long Beach, CA, pp. 2113-2123.

* cited by examiner

*Primary Examiner*—Thomas H Tarcza
*Assistant Examiner*—Harry Liu
(74) *Attorney, Agent, or Firm*—Crowell & Moring LLP

(57) ABSTRACT

A satellite system for providing a navigation service includes a ground segment and a user segment. The ground segment provides information to enable the user segment to autonomously determine the user position performance.

18 Claims, 2 Drawing Sheets

APPARATUS AND PROCESS FOR A GLOBAL NAVIGATION SATELLITE SYSTEM MEETING SAFETY OF LIFE PERFORMANCE REQUIREMENTS

BACKGROUND AND SUMMARY OF THE INVENTION

This application claims the priority of European patent document 06 005 846.8, filed Mar. 22, 2006, the disclosure of which is expressly incorporated by reference herein.

The invention relates to satellite systems that provide navigation services. Examples of such systems are generic Global Navigation Satellite Systems (GNSS) such as Medium Earth Orbit (MEO) constellation based systems (like the American GPS, the Russian GLONASS or the European Galileo), and generic Satellite Based Augmentation Systems (SBAS) like for instance the European EGNOS, the American WAAS or the Japanese MSAS. However, these are only examples. The invention is not restricted to these systems. The invention can apply in all areas where navigation services are deemed to meet performance requirements, including accuracy, integrity and continuity criteria or any combined subset of these criteria. It can apply in many GNSS application domains, including but not limited to aviation, telecommunications, maritime operations, power grid control, terrestrial fleet management, precision agriculture, defense and homeland security, intelligent transport systems and other GNSS applications known in the art.

For navigation services in aviation and other safety of life (SoL) domains, the service performances are defined in terms of user position accuracy (U_Acc), user position continuity (U_Cont) and user position integrity (U_Int) versus predefined alert limits (U_AL).

According to the applicable aviation and other SoL standard requirements, the following definitions apply:

User position error (UE) refers to the difference between a measured or estimated position and the true position at any user location. User position accuracy (U_Acc) refers to 0.95 percentile ("2-sigma") of user position error (UE) distribution model at a given user location.

User position continuity risk (U_Cont) refers to the probability of having, in a coming bounded time interval, a discontinuity of the positioning service (e.g., a probability of $10^{-5}$ within a time interval of 15 seconds).

Signal in space continuity risk (SiS_Cont) refers to the probability of having, in a coming bounded time interval, a discontinuity of the signal in space of a given Satellite (e.g., a probably of $3 \cdot 10^{-6}$ within a time interval of 15 seconds). The discontinuity can be caused by various factors, including signal broadcast interruption or integrity flag being raised by the ground against the considered satellite.

User position integrity risk (U_Int) refers to the probability of having, in a coming bounded time interval, a position error equal or beyond defined vertical/alert limits (U_AL) (e.g., a probability of $10^{-7}$ within a time interval of 150 seconds).

Signal in space integrity risk (SiS_Int) refers to the probability of having, at user level, in a coming bounded time interval and for a given satellite, a signal in space anomalous error (e.g., a probability of $10^{-6}$ within a time interval of 150 seconds). The signal in space integrity risk (SiS_Int) can materialize through various factors including on board clock instabilities, on board transponder path delay instabilities, unpredicted maneuver, ephemeris and clock errors, etc. The distribution of magnitude of unflagged signal in space feared event is over-bounded thanks to (SiS_Int) and to the defined signal in space Alert Limit (SiS_AL).

Signal in space static integrity risk (SiS_IntS) refers to the probability of having, at user level, in a coming bounded time interval and for a given satellite, a signal in space anomalous error, with dynamic lower than SiS_VRL, and no ground segment flag provision under the time to alert requirement conditions (e.g., a probability of $10^{-6}$ within a time interval of 150 seconds). The signal in space static integrity risk (SiS_IntS) can materialize through various factors including on board clock instabilities, on board transponder path delay instabilities, unpredicted maneuver, ephemeris and clock errors, etc. The distribution of magnitude of unflagged signal in space static feared event is over-bounded thanks to SiS_IntS and to the defined signal in space Alert Limit (SiS_AL).

Signal in space dynamic integrity risk (SiS_IntD) refers to the probability of having, at user level, in a coming bounded time interval and for a given satellite, a signal in space anomalous error, with dynamic higher than SiS_VRL and no ground segment flag provision under the time to alert requirement conditions, e.g., a probability of $10^{-6}$ within a time interval of 150 seconds. The signal in space dynamic integrity risk (SiS_IntD) can materialize through various factors including on board clock instabilities, on board transponder path delay instabilities, unpredicted maneuver, ephemeris and clock errors etc. The magnitude of the signal in space feared event is over-bounded thanks to SiS_IntD, to the defined time to alert TTA and to the defined signal in space variation rate limit SiS_VRL.

Especially, the navigation performance requirement for SoL services includes user position accuracy (U_Acc), user position continuity (U_Cont) and user position integrity (U_Int) versus predefined vertical and horizontal alert limits (U_AL). At any given point in time and space, the navigation SoL service is declared available only if the user position accuracy (U_Acc), the user position continuity (U_Cont), and the user position integrity (U_Int) are below thresholds defined by the applicable SoL standard.

Signal in space accuracy (SiS_Acc) refers to a quantity characterizing the spread of the signal in space error distribution in a fault free mode.

Signal in space monitoring accuracy (SiS_MA) refers to a quantity characterizing the spread of the signal in space monitoring error distribution. Combined with defined SiS_AL and SiS_Int/SiS_IntS, these quantities provide an over-bound of the signal in space error in a failure mode.

Signal in space alert limit (SiS_AL) refers to the estimated signal in space error limit above which the ground component of the satellite system provides an integrity flag (IF). Combined with defined SiS_MA and SiS_Int/SiS, IntS, these quantities provide an over-bound of the signal in space error in the failure mode/static failure mode.

Signal in space variation rate limit (SiS_VRL) refers to the estimated signal in space error variation rate limit above which the ground component of the satellite system provides an integrity flag (IF). Combined with defined SiS_IntD, SiS_MA and TTA, these quantities provide an over bound of the signal in space error in a dynamic failure mode.

In the dynamic failure mode, the product SiS_VRL*TTA is the equivalent of defined quantity SiS_AL in the static failure mode.

Time to alert (TTA) refers to the maximum time delay between the appearance of an alert condition and the reception at user level of the subsequent integrity flag provided by the ground component of the satellite system.

Estimated signal in space error (eSISE) refers to the ground component estimation of the signal in space error SISE.

Finally, estimated signal in space variation rate refers to the ground component estimation of the signal in space variation rate (eSISVR).

The prior art has the disadvantage that first it makes no distinction between static and dynamic failure modes (privation of easy detection of a particular kind of failure (ramps, steps)), and second it supposes all of the defined above quantities are hard-coded in user algorithms, except signal in space accuracy (SiS_Acc) and signal in space monitoring accuracy (SiS_M). Hard-coded values have the disadvantages that the system is not adaptive to future evolution, that it is not adaptive to receiver autonomous integrity monitoring facility, that it is not adaptive to low satellites underperformances, and that large margins are necessary, inducing oversizing.

One object of the invention is to provide a satellite system and a process capable of determining the integrity risk and the continuity risk at any user location.

This and other objects and advantages are achieved by the method and apparatus according to the present invention, which provides for the broadcast of all information necessary for risk calculation, enabling the system to be adaptive to future satellites performances evolution. (No value should be hardcoded.)

It is a further advantage of the present invention that the broadcast of different information relevant to different classes of receiver (variable RAIM capabilities, i.e., capabilities referring to ramp detection, receiver coupled to inertial system, etc.) enables the service to be adaptive to user specificity.

It is a further advantage of the present invention that the broadcast of all information necessary to risk calculation makes it possible to reduce the margin which should have been taken with hard coded, and thus to optimize the system.

Other objects, advantages and novel features of the present invention will become apparent from the following detailed description of the invention when considered in conjunction with the accompanying drawings.

DETAILED DESCRIPTION OF THE DRAWINGS

Figure 1:
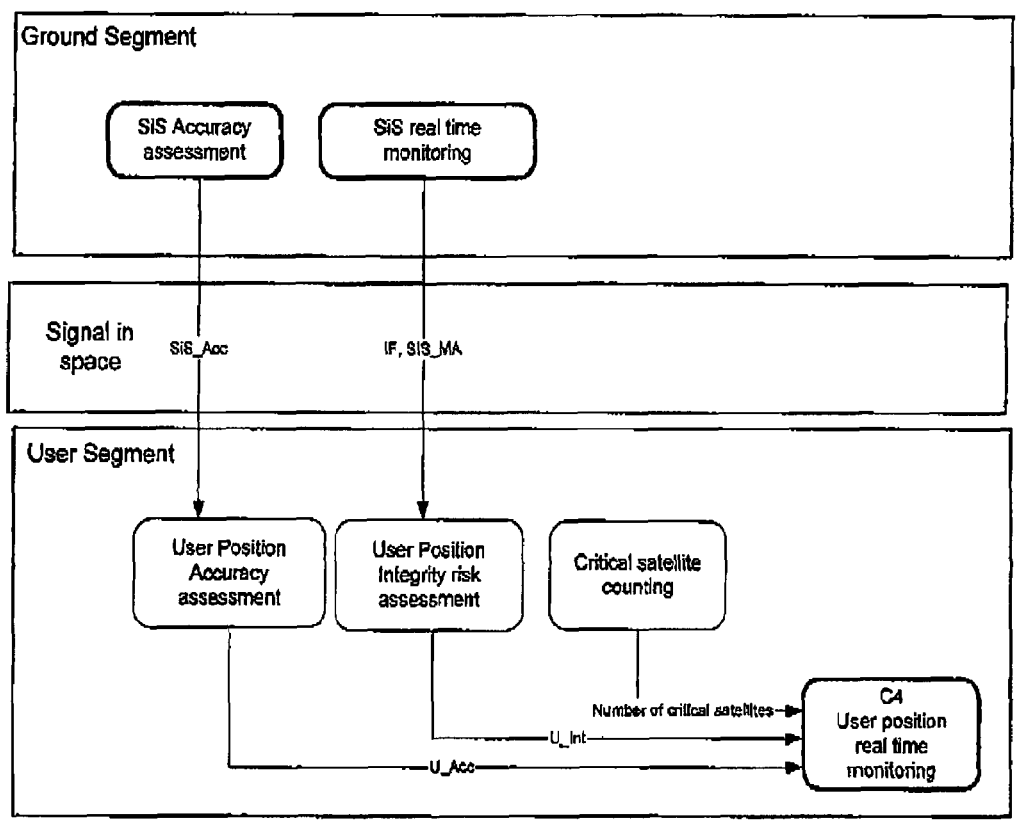
FIG. 1 shows a satellite system according to the prior art.

The satellite system according to the prior art, shown in FIG. 1, includes a ground segment and a user segment. The ground segment, in turn, has a SiS Accuracy assessment, which determines a signal in space accuracy (SiS_Acc), and a SiS real time monitoring, which determines an integrity flag (IF) and a signal in space monitoring accuracy (SiS_AL). The ground segment broadcasts the signal in space accuracy (SiS_Acc), the integrity flag (IF), and the signal in space monitoring accuracy (SiS_MA) through the space segment to the user segment. The user segment of the prior art consists of a user position accuracy assessment, a user position integrity risk assessment, and a critical satellite counting function. The user position accuracy assessment determines a user position accuracy (U_Acc) using the signal in space accuracy (U_Acc). The user position integrity risk assessment determines a user position integrity risk (U_Int). Further, the critical satellite counting function determines the number of critical satellites.

According to the invention, the ground segment of a satellite system determines and broadcasts to the user (possibly via a different communication medium) the expected performances of each satellite signal in space (SiS), including signal in space accuracy (SiS_Acc), signal in space continuity (SiS_Cont), signal in space static integrity (SiS_IntS) versus signal in space alert limit (SiS_AL) and signal in space monitoring accuracy (SiS_MA), signal in space dynamic integrity (SiS_IntD) versus a signal in space variation rate limit (SiS_VRL), signal in space monitoring accuracy (SiS_MA). In general medium refers to space segment or another satellite transmission system or ground transmission system (e.g., radio). Based on the signal in space accuracy (SiS_Acc), the signal in space continuity (SiS_Cont), the signal in space static integrity (SiS_IntS), the signal in space alert limit (SiS_AL), the signal in space monitoring accuracy (SiS_MA), signal in space dynamic integrity (SiS_IntD), and signal in space variation rate limit (SiS_VRL) data received for each satellite in view, the user segment (e.g., a user receiver) will autonomously determine the user position performance comprising user position accuracy (U_Acc), user position continuity (U_Cont), and user position integrity (U_Int) versus user position alert limit (U_AL).

If the User position performance, determined e.g., by the user segment, is within the SoL performance requirement, the user segment will declare the service available.

Parallel to the above process, and to guarantee the broadcast values signal in space accuracy (SiS_Acc), signal in space continuity (SiS_Cont), signal in space static integrity (SiS_IntS), signal in space alert limit (SiS_AL), signal in space monitoring accuracy (SiS_MA), signal in space dynamic integrity SiS_IntD), and signal in space variation rate limit (SiS_VRL), the ground component of the satellite system monitors in real time the residual error of each satellite signal (SiSE) with the signal in space monitoring accuracy (SiS_MA), and broadcasts a DON'T USE integrity flag (IF) if the estimated signal in space error (eSiSE) of a given satellite is beyond the signal in space alert limit (SiS_AL) or the estimated variation rate of the signal in space error is beyond the signal in space variation rate limit (SiS_VRL).

Figure 2:
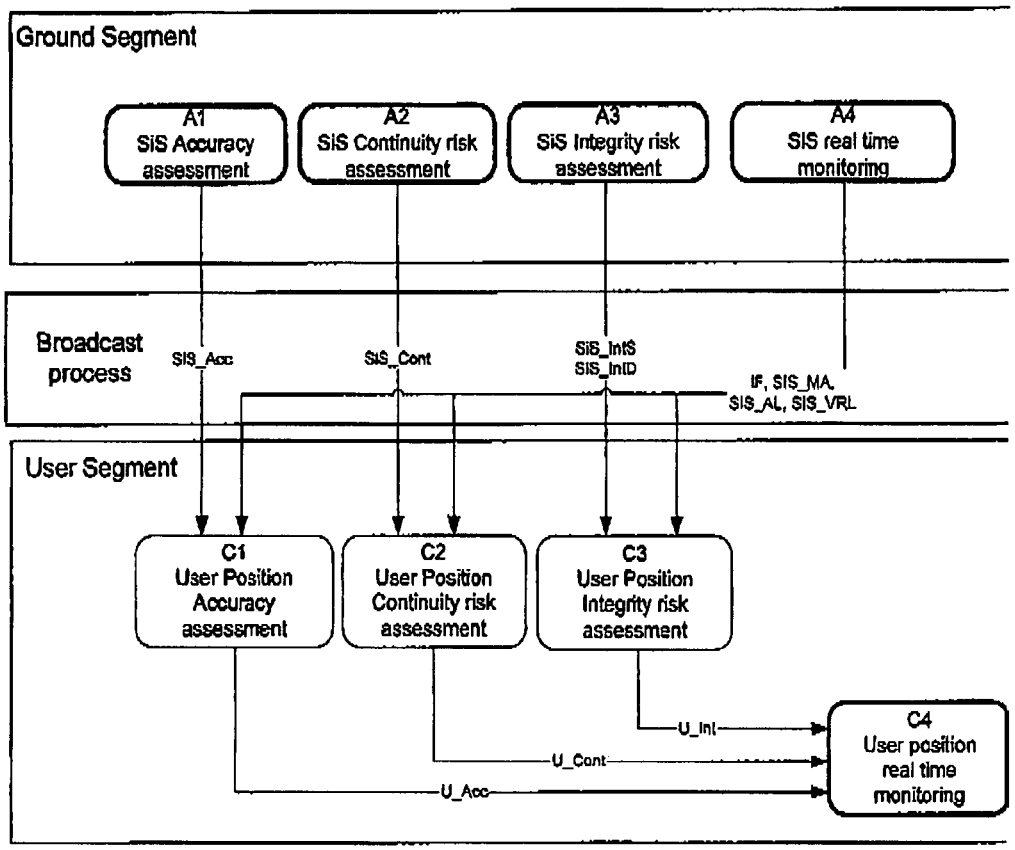
FIG. 2 shows the satellite system according to the present invention.

The invention is now described in greater detail. According to FIG. 2, the system comprises three elements the ground segment, the broadcast process and the user segment. The ground segment monitors the satellite signal in space against accuracy, integrity and continuity criteria. The broadcast process provides signal in space performance characteristics to the user segment over a Space Segment (e.g., an arbitrary combination of a broadcast of signal performance process (B1) using the MEO constellation, a broadcast of signal performance process (B2) using the GEO satellite, and a broadcast of signal performance process (B3) using another broadcast medium (such as Digital Audio Broadcast over terrestrial means), or another broadcast medium). It is especially disclosed that the information can be broadcast over any medium (MEO/GEO) satellites or other terrestrial means. These signal in space performance characteristics include the integrity flag (IF), the applied signal in space alert limit (SiS_AL), the signal in space variation rate limit (SiS_VRL) and the ground segment signal in space monitoring accuracy (SiS_MA). Further, the user segment uses the signal in space accuracy (SiS_Acc), the signal in space static and dynamic integrity risk (SiS_Int; SiS_IntS, SiS_IntD), the signal in space continuity risk (SiS_Cont), the integrity flag (IF), the signal in space alert limit (SiS_AL) and the signal in space variation rate limit (SiS_VRL) made available by the ground segment, to compute the user position accuracy (U_Acc), the user position integrity risk (U_Int), and the user position continuity risk (U_Cont).

According to the invention the SoL navigation service, the implementation of the SoL navigation service comprises the ground segment, the broadcast processes, and the user segment.

The ground segment comprises a SiS accuracy assessment (A1), a SiS continuity risk assessment (A2), a SiS integrity risk assessment (A3), and a SiS real time monitoring (A4).

The SiS accuracy assessment (A1) determines the signal in space accuracy (SiS_Acc). It comprises a regular assessment, for each satellite, of the signal in space accuracy (SiS_Acc), which can be done e.g., by a computation of the standard deviation of the signal in space Error (SiSE) over a certain time frame. This computation can further be based on the pseudo range measurement collected from a network of reference receivers. After the assessment, the SiS accuracy assessment (A1) sends the signal in space accuracy (SiS_Acc) to the user position accuracy assessment (C1) of the User Segment.

The SiS continuity risk assessment (A2) determines the signal in space continuity (SiS_Cont) using a history analysis and extrapolation method. The SiS continuity risk assessment (A2) comprises a regular assessment of the signal in space continuity (SiS_Cont) as defined above for each satellite of the considered satellite system, for instance by a computation based on the statistical analysis of observed discontinuities of the signal in space Error (SiSE) and an extrapolation thereof. This computation can further be based on the pseudo range measurement collected from a network of reference receivers. After the assessment, the SiS continuity risk assessment (A2) sends the satellite signal continuity (SiS_Cont) to the user position continuity risk assessment (C2) of the User Segment.

The SiS integrity risk assessment (A3), which determines the signal in space static and dynamic integrity (SiS_Int; SiS_IntS, SiS_IntD), comprises a regular assessment of the signal in space static and dynamic integrity (SiS_Int; SiS_IntS, SiS_IntD) as defined above, for instance by a computation based on the statistical analysis of observed signal in space error (SiSE) anomalous ramps or brutal variations and extrapolation thereof. This computation can further be based on the pseudo range measurement collected from a network of reference receivers. After the assessment, the SiS integrity risk assessment (A3) sends the satellite signal integrity (SiS_Int; SiS_IntS, SiS_IntD) to the user position integrity risk assessment (C3) of the User Segment.

The SiS real time monitoring (A4), which determines the integrity flag (IF), the signal in space monitoring accuracy (SiS_MA), the signal in space alert limit (SiS_AL), and the signal in space variation rate limit (SiS_VRL), comprises a real time estimation, for each satellites, of the signal in space Error (SiSE) and signal in space Error variation rate (SiSEVR) and a real time check that i) the estimated signal in space error (eSiSE) does not exceed a threshold called signal in space alert limit (SiS_AL) and ii) the signal in space estimated variation rate does not exceed a defined threshold called the signal in space variation rate limit (SiS_VRL). The estimation can be done for instance by a computation based on real time pseudo range measurement collected from a network of reference receivers. The accuracy of the measurement is provided to the user through a signal in space monitoring accuracy value (SiS_MA). After the assessment, the SiS real time monitoring (A4) sends the integrity flag (IF), the signal in space monitoring accuracy (SiS_MA), the signal in space alert limit (SiS_AL), and the signal in space variation rate limit (SiS_VRL) to the user position accuracy assessment (C1), the user position continuity risk assessment (C2), and the user position integrity risk assessment (C3) of the User Segment.

If the real time estimated signal in space error (eSiSE) of a given satellite is beyond the signal in space alert limit (SiS_AL), or if the real time estimated signal in space variation rate (ESiSEVR) is beyond the signal in space variation rate limit (SiS_VRL), an Integrity Flag (IF) is raised and broadcast to the user so that this satellite is excluded by the user from its input to position computation.

The broadcast processes comprise an arbitrary combination of a broadcast of signal performance process (B1) using the MEO constellation, a broadcast of signal performance process (B2) using the GEO satellite, and a broadcast of signal performance process (B3) using another broadcast medium (such as Digital Audio Broadcast over terrestrial means).

The combination of broadcast medium is determined by the data rate requirement (e.g., the data rate necessary for the service), the reliability (continuity risk) requirement, the cost and the required efficiency.

The broadcast processes (B1, B2, B3) comprise broadcasting to the user the ground determined signal in space performance data including the signal in space accuracy (SiS_Acc), the signal in space continuity risk (SiS_Cont), the signal in space static and dynamic integrity risk (SiS_Int; SiS_IntS, SiS_IntD), the signal in space monitoring accuracy (SiS_MA), the signal in space alert limit (SiS_AL), the signal in space variation rate limit (SiS_VRL), and the integrity flag (IF) related to each satellite. This broadcast can be sent via a different medium including the navigation satellite relaying these data to the user segments, e.g., user receivers.

The user segment (e.g., a user receiver), comprises a user position accuracy assessment (C1), a user position continuity risk assessment (C2), a user position integrity risk assessment (C3), and a user position real time monitoring (C4).

The user position accuracy assessment (C1) determines user position accuracy (U_Acc). The user position accuracy assessment (C1) determines the user position accuracy (U_Acc) taking as input the received signal in space accuracy (SiS_Acc) of the various satellites in view. The user accuracy determination is computed from the different SiS_Acc parameters, according to a statistical error model. In the current state of art, a centered Gaussian model is used. After the assessment, the user position accuracy assessment (C1) sends the user position accuracy (U_Acc) to the user position real time monitoring (C4).

The user position continuity risk assessment (C2) determines a user position continuity risk (U_Cont), considering among other inputs, the received signal in space continuity risk (SiS_Cont) of the various satellites in view, Only the signal in space continuity risk SiS_Cont of critical satellites is to be considered in user continuity risk (U_Cont) computation. In the state of art, critical satellites are counted and should be less than six for the service to be available. After the assessment, the user position continuity risk assessment (C2) sends the user position continuity risk (U_Cont) to the user position real time monitoring (C4).

The user position integrity risk assessment (C3) determines a user position integrity (U_Int), considering among other inputs, the received signal in space accuracy (SiS_Acc), the received signal in space integrity risk (SiS_Int), the received signal in space alert limit (SiS_AL), the received signal in space monitoring accuracy (SiS_MA), the received signal in space variation rate limit (SiS_VRL) and the received time to alert (TTA) of the various satellites in view. The user integrity risk determination is computed from the different integrity parameters, according to a statistical error model. In the current state of art, centered and biased Gaussian models are used. After the assessment, the user position integrity risk assessment (C3) sends the user position integrity risk (U_Int) to the user position real time monitoring (C4).

The user position real time monitoring (C4) monitors in real time the following conditions: that the user position accuracy (U_Acc) determined by the user position accuracy assessment (C1) is meeting the SoL service accuracy requirement, that the user position continuity risk (U_Cont) determined by the user position continuity risk assessment (C2) is meeting the SoL service integrity requirement, and that the user position integrity risk (U_Int) determined by the user position integrity risk assessment (C3) is meeting the SoL service continuity requirement.

The user segment declares the SoL positioning service available if various conditions are met, including the conditions just described.

The invention defines the features to be implemented on the ground component of the satellite system and on the User segment of the satellite system, so as to meet these Safety of Life performances in an efficient and certifiable manner.

The invention further provides a process for determining an integrity risk and a continuity risk for a satellite system. In a first step of the process, a ground segment (A1, A2, A3, A4) determines information (SiS_Acc, SiS_Cont, SiS_IntS, SiS_IntD, SiS_MA, SiS_AL, SiS_VRL, TTA) needed for a user position performance (U_Acc, U_Cont, U_Int). Next the ground segment (A1, A2, A3, A4) broadcasts the information (SiS_Acc, SiS_Cont. SiS_IntS, SiS_IntD, SiS_MA, SiS_AL, SiS_VRL, TTA) to a user segment (C1, C2, C3, C4). Then, the user segment (C1, C2, C3, C4) autonomously determines the user position performance (U_Acc, U_Cont, U_Int). The process also comprises the step that the broadcast of the information (SiS_Acc, SiS_Cont, SiS_IntS, SiS_IntD, SiS_MA, SiS_AL, SiS_VRL, TTA) to the user segment (C1, C2, C3, C4) is performed via a broadcast process as described above. Further details of the process result for those skilled in the art from the description of the satellite system above.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A satellite system for providing a navigation service, said satellite system comprising:
    a ground segment; and
    a user segment; wherein,
    the ground segment provides information to enable the user segment to autonomously determine user position performance; and
    the information comprises at least one of the parameters i) signal in space accuracy, ii) signal in space continuity, iii) signal in space static integrity, iv) signal in space dynamic integrity, v) signal in space monitoring accuracy, vi) signal in space alert limit, vii) time to alert, and viii) signal in space variation rate limit.

2. The satellite system according to claim 1, wherein the information is provided to the user segment via a broadcast process.

3. The satellite system according to claim 2, wherein the broadcast process comprises one of i) a satellite, ii) a terrestrial communication link; and iii) a combination of satellites and terrestrial communication links for broadcasting the information to the user segment.

4. The satellite system according to claim 1, wherein the ground segment includes a signal in space continuity risk assessment that determines at least a signal in space continuity, a signal in space integrity risk assessment that determines a signal in space static integrity, and a signal in space dynamic integrity.

5. The satellite system according to claim 1, wherein the user segment comprises a user position continuity risk assessment that determines a user position continuity risk.

6. The satellite system according to claim 1, wherein user position performance comprises at least one of the parameters user position continuity risk and user position integrity risk.

7. A process for determining user position performance, including at least user position integrity risk and user position continuity risk at a particular user location, for a user of a satellite navigation service that includes a ground segment and a user segment which communicate with satellites in a satellite navigation system, said process comprising:
    said ground segment determining information needed for evaluating user position performance at said particular user location;
    said ground segment broadcasting said information to said user segment via a broadcast process; and
    based on said information, said user segment autonomously determining current user position performance at said particular user location; wherein,
    said information determined by said ground segment comprises satellite expected performance data for each satellite in view; and
    said user position performance comprises at least said user position integrity risk and said user position continuity risk;
    said satellite expected performance data includes a signal in space accuracy assessment, signal in space real time monitoring, a signal in space continuity risk assessment and a signal in space integrity risk assessment for each satellite that is in view.

8. The process according to claim 7, wherein:
    said signal in space continuity risk assessment determines signal in space continuity based on a history analysis and an extrapolation method; and
    said signal in space integrity risk assessment determines signal in space static and dynamic integrity based on one of i) a statistical analysis of observed signal in space error ramps or brutal variations using an extrapolation method, and ii) a pseudo range measurement collected from a network of reference receivers.

9. The process according to claim 7, wherein said user position performance data includes, user position accuracy, user position continuity and user position integrity for a given point in time and space.

10. The process according to claim 8, wherein:
    user position continuity risk is determined based on said signal in space continuity risk of satellites that are within view; and
    user position integrity risk is determined based on at least signal in space accuracy and said signal in space integrity risk, using a statistical error model.

11. The process according to claim 7, further comprising:
    if said user position performance data determined by said user segment at said particular user location satisfies preset performance requirements, said user segment determining that said satellite navigation service is available to said particular location.

12. A satellite system for providing a navigation service, said satellite system comprising a ground segment and a user segment that communicate with satellites in said satellite system, wherein:
- said ground segment determines satellite expected performance data for each of said satellites that is in view;
- said ground segment broadcasts said satellite expected performance data to said user segment to enable the user segment to determine user position performance, including at least user position integrity risk and user position continuity risk, for a user of the satellite navigation service;
- based on said satellite expected performance data, said user segment autonomously determines user position performance for said user segment at a particular time and user location;
- if said user position performance determined by said user segment satisfies preset performance requirements, said user segment determines that said satellite navigation service is available at said particular location; and
- said satellite expected performance data includes a signal in space accuracy assessment, signal in space real time monitoring, a signal in space continuity risk assessment and a signal in space integrity risk assessment for each satellite in view.

13. The process according to claim 12, wherein:
- said signal in space continuity risk assessment determines signal in space continuity based on a history analysis and an extrapolation method; and
- said signal in space integrity risk assessment determines signal in space static and dynamic integrity based on one of i) a statistical analysis of observed signal in space error ramps or brutal variations using an extrapolation method, and ii) a pseudo range measurement collected from a network of reference receivers.

14. The process according to claim 12, wherein said user position performance data includes user position accuracy, user position continuity and user position integrity for a given point in time and space.

15. The process according to claim 13, wherein:
- user position continuity risk is determined based on said signal in space continuity risk of satellites that are within view; and
- user position integrity risk is determined based on at least signal in space accuracy and said signal in space integrity risk, using to a statistical error model.

16. The satellite system according to claim 12, wherein the broadcast process comprises one of i) a satellite, ii) a terrestrial communication link; and iii) a combination of satellites and terrestrial communication links for broadcasting the information to the user segment.

17. The satellite system according to claim 12, wherein the ground segment determines a signal in space continuity risk and a signal in space integrity risk, including a signal in space static integrity risk, and a signal in space dynamic integrity risk.

18. The satellite system according to claim 12, where the satellite expected performance data comprises at least one of the parameters i) signal in space accuracy, ii) signal in space continuity, iii) signal in space static integrity, iv) signal in space dynamic integrity, v) signal in space monitoring accuracy, vi) signal in space alert limit, vii) time to alert, and viii) signal in space variation rate limit.

* * * * *